United States Patent
Gilbert et al.

(10) Patent No.: US 9,197,663 B1
(45) Date of Patent: Nov. 24, 2015

(54) METHODS AND SYSTEMS FOR IDENTIFYING POTENTIAL ENTERPRISE SOFTWARE THREATS BASED ON VISUAL AND NON-VISUAL DATA

(71) Applicant: BIT9, Inc., Waltham, MA (US)

(72) Inventors: Mark Gilbert, Atlanta, GA (US); Jeffrey J. Guy, New Orleans, LA (US)

(73) Assignee: Bit9, Inc., Waltham, MA (US)

( * ) Notice: Subject to any disclaimer, the term of this patent is extended or adjusted under 35 U.S.C. 154(b) by 0 days.

(21) Appl. No.: 14/608,999

(22) Filed: Jan. 29, 2015

(51) Int. Cl.
*G06F 12/14* (2006.01)
*H04L 29/06* (2006.01)
*G06F 21/56* (2013.01)

(52) U.S. Cl.
CPC ............ *H04L 63/145* (2013.01); *G06F 21/562* (2013.01); *H04L 63/08* (2013.01); *H04L 63/20* (2013.01); *G06F 21/563* (2013.01); *G06F 21/564* (2013.01); *G06F 21/565* (2013.01)

(58) Field of Classification Search
CPC ........................................ G06F 21/562–21/565
See application file for complete search history.

(56) References Cited

U.S. PATENT DOCUMENTS

| | | | |
|---|---|---|---|
| 6,804,778 B1 * | 10/2004 | Levi et al. .................... 713/176 |
| 8,256,000 B1 * | 8/2012 | Krishnappa .................... 726/24 |
| 8,719,100 B1 * | 5/2014 | Flemings et al. ........... 705/14.72 |
| 2009/0029693 A1 * | 1/2009 | Liwell et al. ................... 455/419 |
| 2009/0158164 A1 * | 6/2009 | Nadeem et al. ............... 715/741 |
| 2011/0047620 A1 * | 2/2011 | Mahaffey et al. ................ 726/23 |
| 2013/0103836 A1 * | 4/2013 | Baniqued et al. ............. 709/226 |
| 2013/0276105 A1 * | 10/2013 | Hinchliffe et al. .............. 726/22 |
| 2014/0365794 A1 * | 12/2014 | Decker et al. ................. 713/320 |
| 2014/0366137 A1 * | 12/2014 | Tatarinov ........................ 726/24 |

OTHER PUBLICATIONS

"How Hackers Can Disguise Malicious Programs With Fake File Extensions", How-To Geek, Nov. 1, 2013, Retrieved from the Internet Archive on May 31, 2015 at https://web.archive.org/web/20131101211345/http://www.howtogeek.com/127154/how-hackers-can-disguise-malicious-programs-with-fake-file-extensions/.*
P. Cano. Content-based audio search: From fingerprinting to semantic audio retrieval, Pompeu Fabra University, 2006, pp. iii-iv, vii-xi, and 1-197. Available at <http://mtg.upf.edu/files/publications/34ac8d-PhD-Cano-Pedro-2007.pdf>.

(Continued)

*Primary Examiner* — Matthew Henning
(74) *Attorney, Agent, or Firm* — Goodwin Procter LLP

(57) ABSTRACT

Visual and non-visual elements associated with the candidate files are analyzed to determine whether the candidate files are malware. A visual element (e.g., icon) is extracted from the candidate file, and the icon's image is compared to a group of reference images associated with trusted entities. If the icon's image matches a reference image, the candidate file may be malware masquerading as trusted software. The non-visual elements associated with the candidate file are used, in combination with the visual elements, to determine whether the candidate file is malware.

25 Claims, 6 Drawing Sheets

(56) References Cited

OTHER PUBLICATIONS

Best practices for brand protection and effective enforcement in China, pp. 1-6. Available at <https://www.markmonitor.com/download/wp/MarkMonitor-Brand_Protection_China.pdf>, last accessed on Jan. 23, 2015.

P. Fieguth et al. Phase-based methods for Fourier shape matching. In Proceedings of IEEE International Conference on Acoustics, Speech, and Signal Processing (ICASSP), 2004, pp. III-425 to III-428.

* cited by examiner

METHODS AND SYSTEMS FOR IDENTIFYING POTENTIAL ENTERPRISE SOFTWARE THREATS BASED ON VISUAL AND NON-VISUAL DATA

FIELD OF INVENTION

The invention relates generally to identifying malicious and unwanted software camouflaged as legitimate software. More specifically, in one embodiment, the invention relates to methods and systems for using both visual metadata and non-visual metadata to determine if a candidate file is malware.

BACKGROUND

In the United States and elsewhere, computers have become part of people's everyday lives, both in the workplace and in personal endeavors. This is because a general-purpose computer can be programmed to run a variety of software programs each providing different processing and networking functions. Typically, the software programs are selected and installed at the request of or on behalf of the user of a particular computer, and operate according to expectations. Furthermore, with the advent of global communications networks such as the Internet, computers can now be connected in a "virtual network"—thus allowing companies and people to retrieve and share vast amounts of data, including software programs. The ability to distribute software programs using the Internet quickly and at a significantly reduced cost when compared to traditional means (e.g., diskettes, CD-ROMs) has made the delivery of software to endpoint devices (e.g., desktop computers, laptop computers, tablets, smartphones, set-top boxes, wearable devices, point-of-sale devices, and/or any other suitable client devices) an almost trivial exercise. The proliferation of endpoint devices ("endpoints") and the implementation of "BYOD" (Bring Your Own Device) policies at many companies, schools, government agencies and other institutions has only increased the importance of maintaining malware-free endpoints, as they often serve as the entry point into a secure computing environment.

Along with the benefits of these devices and a more open environment, however, come opportunities for mischievous and even illegal behavior. Unwanted software programs are distributed throughout the Internet in an attempt to elicit information from unsuspecting users, take control over individual computers, alter computer settings, and in some cases even disable entire networks. The threat posed by such malicious software ("malware") is well-documented and continues to grow. Furthermore, the sophistication and covert nature of malware seem to outpace industry's attempts to contain it.

Conventionally, malware detection has focused on a "signature" based approach. Signature methods generally rely on a list or database of filenames and/or fingerprints of files commonly used by malware vendors, and, when a candidate file matches a signature that is known to represent malware, isolate the file for further testing. One example is the identification of executable files (e.g., .EXE, .COM, .DLL, etc.) and the systematic analysis of the various functions that these files initiate once active. Generally, this is done in a partition of the computer or set of memory addresses that are isolated from the rest of the computer, so as not to accidentally infect the computer during scanning. Any files suspected of being malware are then quarantined for further analysis and/or user review.

However, the signature-based approach may not always be 100% effective at detecting and quarantining malware, and computer users often unknowingly facilitate malware attacks on their own computer and computer networks by initiating execution of programs containing malware. One method often exploited by the purveyors of malware is to rely on the end user's trust of certain entities (e.g., well-known software providers), and disguise files, links or other operations as being sent from a trusted provider. For example, a file containing spyware, adware, or keyboard logging files might present itself using an icon from an otherwise reputable provider.

What is needed, therefore, is a method and system for detecting malware that masquerades as if being from a trusted provider by presenting a known, trusted image or icon.

SUMMARY OF THE INVENTION

The present invention identifies malware and other potentially harmful and/or untrusted software packages by combining an analysis of visual and non-visual information associated with the software packages. Many nefarious software installations and updates attempt to gain a user's trust by masquerading as legitimate applications or coming from a trusted provider by integrating highly-recognizable icons and images when such software is presented to users. Once a user clicks on, selects or otherwise initiates the update, download or installation, the malware injects itself into the endpoint device, and, in many instances, can infect an entire environment.

Therefore, in one aspect the invention provides a method for identifying potential enterprise cyber threats camouflaged as legitimate software packages using a combination of visual and non-visual elements of the software package. As a software package is presented for an action on an endpoint device within an enterprise, visual and non-visual elements of the software package are identified. In many instances, the visual element extracted from or associated with the software package comprises an icon with an image that appears substantially similar to a reference image, which is often associated with a trusted entity. A comparison of the image associated with the extracted icon and the reference image is performed, and non-visual elements are extracted from the software package. Based on a combination of the results of the comparison and the extracted non-visual elements, a determination is made as to whether the software package comprises a legitimate software package or a potential threat to the enterprise.

In certain embodiments, the non-visual elements can include data identifying a publisher, filenames, external function calls, registered operating system functions, operating system filenames, registry key, system file value, application filenames, library filenames, file size, provider, vendor tags and path names. The visual elements can include an icon, which may be presented in raster format (e.g., in the format of an .ico file, a .jpg file, an .img file, a .tiff file, a .gif file, a .bmp file, or a .png file) or in a vector format. In certain implementations the size of the visual information is less than 1 megabyte. The visual elements and non-visual elements may be each extracted from separate components of the software package.

The comparison of the extracted visual element to the icon associated with a trusted entity may include the application of one or more filters, which may be domain-specific, source-specific and/or class-specific.

In some embodiments, software packages that are determined to present a threat to the enterprise are captured and stored in a database for subsequent use as a threat database. In instances in which untrusted providers or packages are identified, an alternate, trusted provider or path may be provided. Further, software packages deemed to be legitimate, but that include credentials or metadata not previously identified as legitimate may be added to a database of trusted providers and/or packages. A collection of trust rules may be compiled and annotated as newly identified trustworthy providers are identified.

The action may include an update of a software component, an update of a software application, an update of a software library, an update of an application extension, installation of a software component, installation of a software application, installation of an application extension, installation of a software library, and/or execution of a software component.

In some embodiments, performing the comparison of the icon image and the reference image may involve determining a difference between a quantitative identity of the icon image and a quantitative identity of the reference image. Determining the quantitative identity of the icon image may involve transforming the icon image and/or applying an edge detection operator to the icon image. Transforming the icon image may involve applying a noise filter to the icon image, scaling the icon image, reflecting the icon image, and/or performing color reduction on the icon image. The edge detection operator may comprise a Marr-Hildreth operator.

In some embodiments, performing the comparison of the icon image and the reference image may involve determining whether the difference between the quantitative identity of the icon image and the quantitative identity of the reference image is less than a threshold difference.

In some embodiments, the extracted non-visual elements may include authentication credentials of the software package. Determining whether the software package comprises a legitimate software package or a potential threat to the enterprise may involve determining whether the authentication credentials of the software package are provided by a publisher of the reference image.

In some embodiments, the extracted non-visual elements may include the software package's type. Determining whether the software package comprises a legitimate software package or a potential threat to the enterprise may involve determining whether the icon image is consistent with the software package's type.

In some embodiments, determining whether the icon image is consistent with the software package's type may involve determining that the icon image is associated with a non-executable file type, determining that the software package is executable, and determining that the icon image is not consistent the software package's type.

In some embodiments, determining whether the icon image is consistent with the software package's type may involve determining that the icon image is associated with a function of an operating system, determining that the software package is executable, and determining that the icon image is not consistent with the software package's type.

Other aspects and advantages of the invention will become apparent from the following drawings, detailed description, and claims, all of which illustrate the principles of the invention, by way of example only.

BRIEF DESCRIPTION OF THE DRAWINGS

The above and further advantages of the invention may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION

Anti-virus and anti-spyware software generally refers to software that detects, quarantines, and in some cases removes software that is malicious in nature and generally unwanted from a computer or computers. Such malicious files, referred to herein as "malware," may include any type of file, whether static or dynamic, interpreted or compiled, written in any software language or in any form (e.g., component, application, electronic message, transmission, script, library or executable). Non-limiting examples of malware include, for example, worms, viruses, spam, applications that enable pop-up advertisements, and programs that search for and/or relay sensitive user information. Malware often takes the form of a program that is covertly transmitted to a computer over a network for the purpose of disrupting operations of the computer, intercepting and transmitting information from the computer to another computer, and/or changing settings on the computer. Although it should be understood that the invention has relevance to detecting virtually any sort of software whether wanted or unwanted that performs any function, and can be implemented in any suitable manner, for explanatory purposes the ensuing discussion will focus on the detection and elimination of malware from computers connected to a network such as the Internet.

Spyware, as used herein, relates to certain forms of malware that covertly gathers user information through a computer's Internet connection without the knowledge or permission of its operator. Typically, spyware is used for advertising purposes, such as enabling and presenting pop-up ads and redirecting web-page requests to alternate web addresses. Spyware applications may be bundled as a hidden component of freeware or shareware programs, which are often downloaded from the Internet. Once installed, the spyware can, for example, monitor user activity on the Internet and transmit information (sites visited, for example) to another computer without the operator's knowledge, and in some cases gather information about e-mail addresses, names, passwords and credit card numbers. The independent, executable nature of the spyware programs gives them the ability to monitor keystrokes, scan files on the hard drive, snoop other applications (e.g., chat, word processors, email, etc.), install other spyware programs, read cookies, and change the default home page on the web browser, as well as other purposes. The user information may be transmitted back to the provider of the spyware (or in some cases a third party) who then uses it without restriction or knowledge of the user.

In addition to the issues of privacy and data security, spyware may also have detrimental effects on the operation of the computer and/or network on which it resides. Because the transmission and operation of the spyware consume bandwidth and memory, users often experience a degradation in system performance, instability, and even total system failure.

Figure 1:
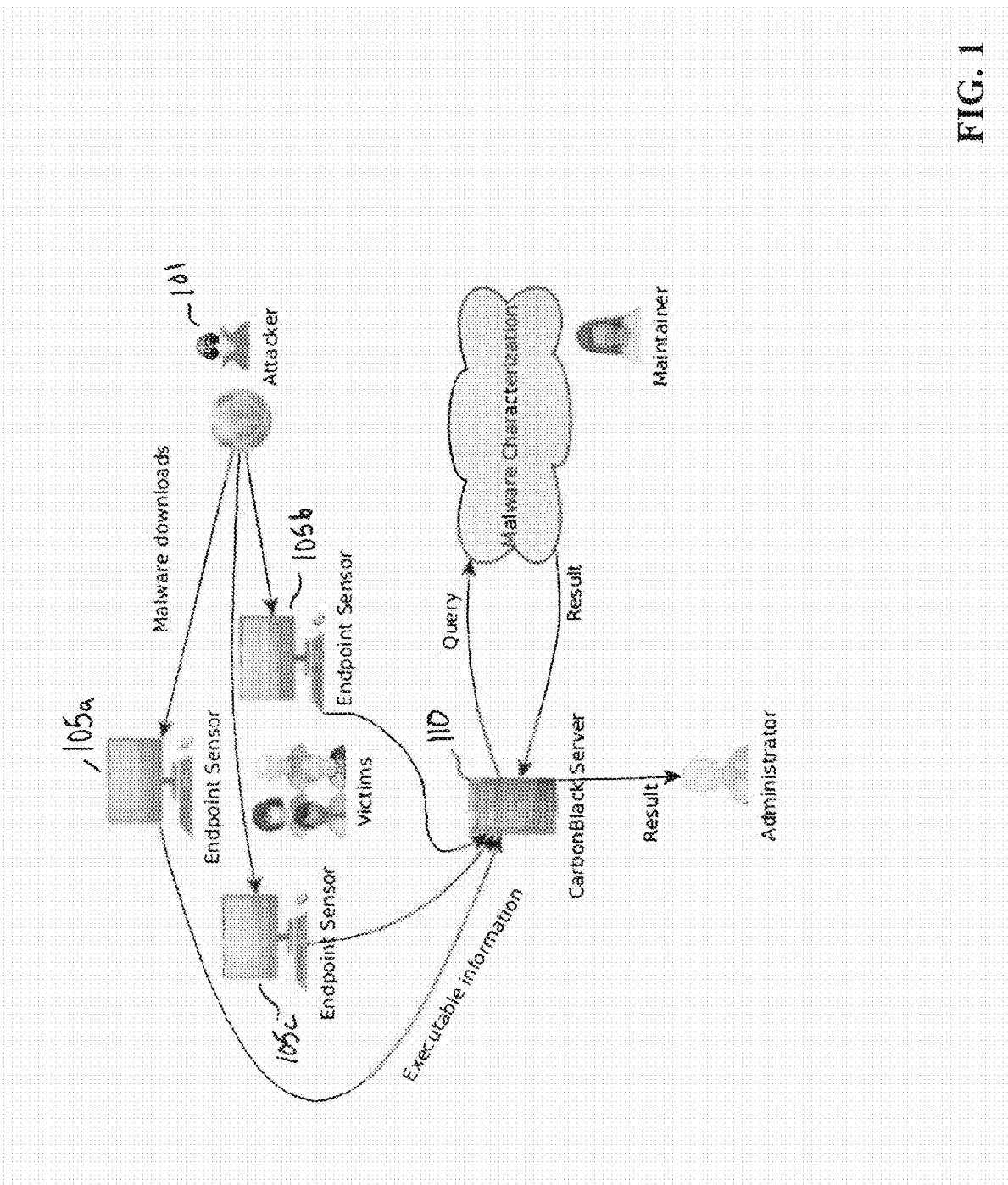
FIG. 1 is a dataflow diagram of a system for identifying malware, according to some embodiments.

Referring to FIG. 1, in some embodiments, a system 100 for identifying malware includes at least one client computer 105 and a malware detection server 110. The illustrative configuration is only for exemplary purposes, and it is intended that there can be any number of clients 105 and servers 110.

As can be seen in FIG. 1, malware developed by an attacker 101 may be downloaded to a client computer 105 (e.g., via a computer network). The malware may include an icon that is presented to a user through the client computer's user interface, and a software package configured to execute when selected, clicked, or otherwise activated by a user.

Figure 2:
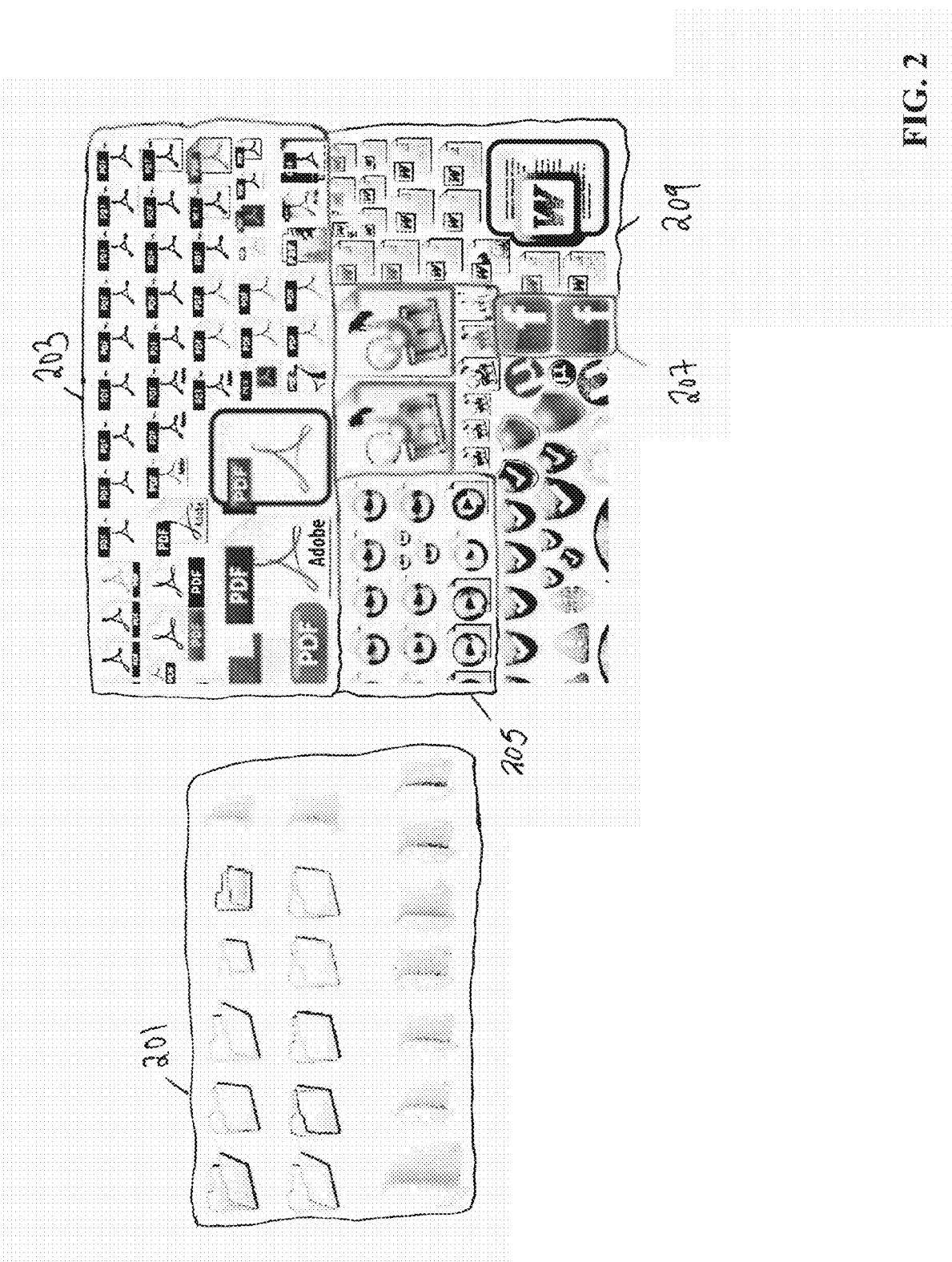
FIG. 2 shows examples of some icons substantially similar to some icons associated with trusted entities.

As discussed above, malware may camouflage itself as trusted software by presenting an icon associated with a known, trusted software provider. FIG. 2 shows numerous examples of icons that resemble well-known images, but have been altered to evade conventional signature-based detection techniques (e.g., content matching) and/or image-matching techniques. For example, FIG. 2 shows variants 201 of a "folder" icon, variants 203 of a "PDF file" icon, variants 205 of a "WAV file" icon, variants 207 of a "Facebook" icon, and variants 209 of a "Microsoft Word document" icon. As can be seen, many of the altered images appear substantially similar to their trusted counterparts, despite the alterations, which include blurring, speckling, re-coloring (e.g., subtle changes in coloring), addition/removal of borders or other components, etc.

When a software package is downloaded and/or executed (e.g., when execution of the software package is initiated) by client computer 105, data relating to the software package may be sent to malware detection server 110. In some embodiments, the data sent to malware detection server 110 may include data identifying the software package (e.g., a cryptographic hash of the software package) and/or a copy of the software package. For example, if the malware detection server is unable to identify the software package based on the identifying data, the malware detection server may request and receive a copy of the software package from the client computer.

In some embodiments, malware detection server 110 may determine whether the software package accessed by client computer 105 is malware (e.g., whether the software package poses a threat to the client computer). Determining whether the software package is malware may include assessing the risk posed by the software package, determining whether the risk posed by the software package exceeds a risk threshold, and classifying the software package as malware if the risk exceeds the risk threshold.

Figure 3:
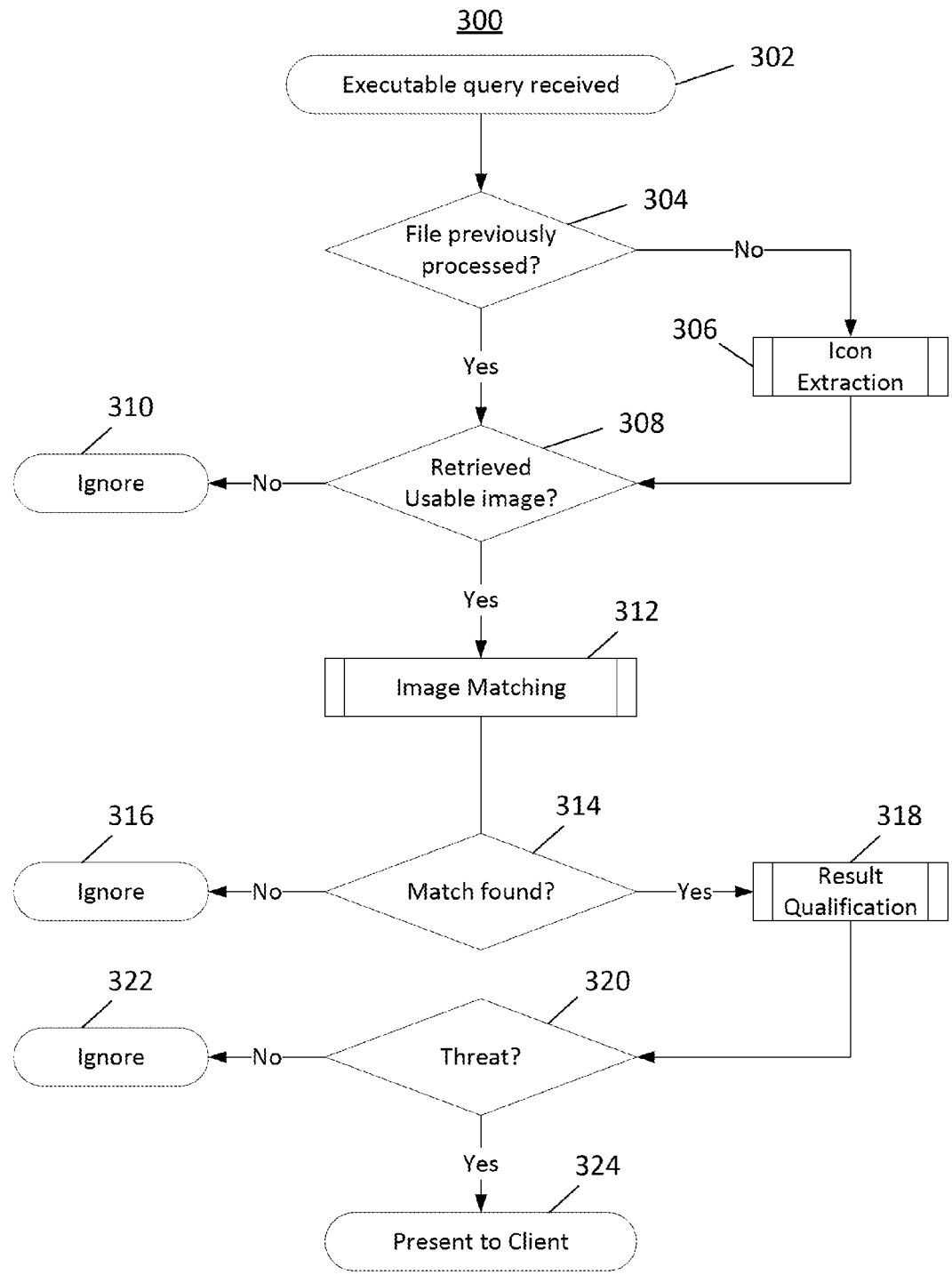
FIG. 3 is a flowchart of a method for identifying malware, according to some embodiments.

A method 300 for identifying malware is shown in FIG. 3. In some embodiments, malware detection server 110 may perform method 300 to determine whether software is malware. At step 302 of method 300, malware detection server 110 may receive data identifying a software package. In some embodiments, this identifying data may be sent to malware detection server 110 by a client computer 105. The identifying data may be used by client computer 105 and malware detection server 110 to uniquely identify the software package. The client computer may send the identifying data to malware detection server 110 in response to the corresponding software package being downloaded to the client computer, in response to execution of the software package being initiated on the client computer, and/or in response to any other suitable event.

At step 304 of method 300, malware detection server 110 may determine whether the server has previously processed the software package identified by the identifying data. In some embodiments, malware detection server 110 may maintain an index of data identifying software packages. To determine whether the server has previously processed the software package identified by the received identifying data, the server may compare the received identifying data to the indexed identifying data.

In cases where the server determines that the identified software package has not previously been processed (e.g., because no identifying data in the index matches the received identifying data), server 110 may proceed to step 306. At step 306, server 110 may extract one or more (e.g., all) icons from the identified software package. In some embodiments, server 110 may receive the software package at step 302, along with the data identifying the software package. In some embodiments, after determining that the identified software has not previously been processed, server 110 may request and receive the software package from client 105.

As described above, some embodiments may include two or more servers 110. In some embodiments, client 105 communicates with a first server 110, and the first server 110 also communicates with a second server 110, which stores the index of identifying data and performs the bulk of the processing associated with method 300. The data identifying the software package may be used by client 105 and servers 110 to uniquely identify the software package. In cases where the second server 110 determines that the identified software package has not previously been processed (e.g., because second server 110 does not recognize the package's identifying data, does not have a copy of the package, or does not have a copy of information extracted from the package), second server 110 may request the package from first server 110, which may forward the request to client 105.

Server 110 may extract the one or more icons from the software package using any suitable technique. In some embodiments, server 110 may extract the image associated with each icon from the software package in its native format, convert the image to a common format (e.g., a subset of the Portable Network Graphic (.PNG) format, or any other suitable format), and save the converted image as an individual image. In some embodiments, server 110 may extract metadata corresponding to an icon (e.g., the size of the icon image, the position of the icon data within the executable file, etc.) and store the icon's extracted metadata in association with the corresponding image.

As described above, server 110 may extract one or more (e.g., all) icons from the software package. In some embodiments, server 110 may extract all icons from the software package, even if an icon does not conform to the standard associated with the software package's format, and/or even if the icon's image does not conform to the standard associated with the image's professed format. By extracting all icons, server 110 may correctly identify a software package as malware even when the software package includes malformed files and/or variations specific to a software platform, version, or environment. Such malware features might otherwise enable the malware to evade detection.

In some embodiments, server 110 may process an icon image (e.g., an extracted icon image converted to a specified format) to produce data that characterizes the corresponding image. Such data may be referred to herein as a "quantitative identity" or "digital characterization" of the image. In some embodiments, the images' quantitative identities may be suitable for comparing the images to determine the extent of the similarity (or difference) between the images. For example, the quantitative identity of an image may be detailed enough to distinguish the image from unrelated images, but not so specific as to distinguish the original image from altered but recognizable versions of the image.

In some embodiments, the process of determining an image's quantitative identity may involve identifying features of the image that are both (1) characteristic of the image, and (2) improbable (e.g., unlikely to be present in unrelated images). The inventors have recognized and appreciated that, for purposes of detecting malware icons masquerading as trusted icons, the locations of edges and/or shapes in the icon images may be significant. In particular, the inventors have appreciated that the locations of edges and/or shapes in an icon image may be significant because icon images are often too small to permit substantial variation in the locations of the image's edges and/or shapes. Thus, the locations of edges and/or shapes in an icon image may be characteristic of the image and improbable.

The inventors have also recognized and appreciated that, for purposes of detecting malware icons masquerading as trusted icons, similarities or differences in coloring may not be significant. In particular, the inventors have appreciated that malware attackers typically seek to maximize their malware's proliferation by using icons that are compatible with a wide range of computer systems. Since many legacy computer systems allow icons to use only a small set of colors, many malware icon images may use only a small set of colors. Thus, the coloring of an icon image may be neither characteristic of the image nor improbable.

Server 110 may use any suitable technique to determine a quantitative identity of an icon image (e.g., an icon image that has been converted to a specified format). In some embodiments, determining the quantitative identity of an icon image may include performing one or more of the following transformations and/or analyses: scale normalization (e.g., adjusting the size of the icon image to match a reference size), region selection (e.g., entropy-based region selection) (e.g., segmenting the image into regions with distinct attributes), spectrum reduction (e.g., reducing the resolution of the image, which may reduce noise and/or facilitate pattern matching), color smoothing (e.g., determining the mean color value for at least a portion (e.g., region) of the image, and adjusting the color value throughout at least the portion of the image to match the mean color value), corner emphasis, edge detection, noise reduction (e.g., noise filtering) and/or any other suitable transformation and/or analysis. In some embodiments, server 110 may perform the transformations and/or analyses progressively and/or iteratively.

In some embodiments, the image analyses and/or transformations performed by server 110 may de-emphasize or eliminate some features of the image that are not characteristic of the image and/or not improbable. In some embodiments, the image analyses and/or transformations performed by the server may improve the robustness of image comparison operations (described below) to obfuscations that may be used by malware attackers to produce icon images, including, without limitation, direct transformations (e.g., noise injection, blurring, re-imposition, superimposition, rotation, reflection, scaling, skewing, spectral shifting, spectral inversion, spectral substitution (e.g., selective color substitution), etching, texture mapping, aliasing, introduction of simulated artifacts, offset cropping, shadowing, shading) and indirect transformations (e.g., compression, gamma alteration, alpha alteration).

The inventors have appreciated that noise reduction may have a significant impact on the system's ability to identify malware. Noise injection is a common obfuscation technique used by malware attackers to produce malware icons that appear similar to trusted images. In some embodiments, server 110 may perform noise reduction on an icon image by applying a noise filter (e.g., low-pass noise filter) to the image (e.g., by convolving the image with a Gaussian function).

In some embodiments, determining the quantitative identity of an icon image may include quantifying and probabilistically ordering the features of the icon image (e.g., after applying the above-described transformations and/or analyses). Server 110 may use any suitable technique and/or operator to quantify and probabilistically order the features of the image, including, without limitation, a Marr-Hildreth operator, an operator based on histogram features of the image, an operator based on mean values (e.g., ordered mean values) of features of the image, and/or a high-level object identification technique. In some embodiments, server 110 may apply any suitable pre-processing and/or post-processing techniques to the image, including, without limitation, prospective reflections, rotations, and/or scaling. In some embodiments, such pre- and/or post-processing techniques may improve the robustness of the image-comparison operations described below.

The inventors have appreciated that using the Marr-Hildreth operator to quantify and probabilistically order the features of an image may be beneficial for identifying malware icons camouflaged as trusted images. In general, the Marr-Hildreth operator may not be suitable for image recognition applications, because the operator is sensitive to local extrema in images. However, the inventors have appreciated that the Marr-Hildreth operator is suitable for image recognition in the context of malware detection, because the operator is sensitive to the locations of edges (which, as described above, may be significant), and because in this context the operator's output is used to identify the image's provenance, rather than to modify the image, isolate a portion of the image, or describe the image.

After determining the quantitative identity of an icon image, server 110 may store that quantitative identity in association with the icon image. As described above, server 110 may maintain an index of data identifying software packages. In some embodiments, server 110 may store the quantitative identity of an icon image in association with the index data that identifies the software package from which the corresponding icon was extracted.

After server 110 determines that the software package in question has already been processed, or after the server performs icon extraction on the software package, the server may proceed to step 308 of method 300. At step 308, the server determines whether any icon images are associated with the software package. If there are no icon images associated with the software package, server 110 may determine that the software package is not using icon images to masquerade as trusted software, and terminate method 300 at step 310. If at least one icon image is associated with the software package, server 110 may proceed to step 312.

At step 312, server 110 may compare the icon image(s) associated with the software package to a reference group of images. In some embodiments, comparing an icon image to a reference image may include determining a difference between the quantitative identities of the icon image and the reference image. Any suitable operator may be used to determine the difference between quantitative identities, including, without limitation, a proportional Hamming distance operator. Determining the Hamming distance between quantitative identities may involve performing a pairwise comparison of bits of the feature values of the quantitative identities to determine whether the pairwise bits have the same value, counting the total number of bits for which the quantitative identities have different values, and dividing the count of different bits by the total number of feature bits.

In some embodiments, server 110 may compare the Hamming distance to a threshold to determine whether the icon image corresponding to the first quantitative identity matches (e.g., is "substantially similar to") the reference image corresponding to the second quantitative identity. For example, server 110 may determine that the icon image matches the reference image if the Hamming distance between the images is less than the threshold value. Any suitable threshold value may be used. Increasing the threshold value may increase the rate at which camouflaged malware icons are detected, but may also increase the rate of false positives. Likewise, decreasing the threshold rate may decrease the rate of false positives, but may also decrease the rate at which camouflaged malware icons are detected. In some embodiments, the same threshold distance may be associated with each reference image. In some embodiments, different threshold distances may be associated with different reference images.

Any suitable threshold value may be used, and a suitable threshold value may be determined using any suitable technique. In some embodiments, the threshold value may be tuned, automatically or manually, based on the performance of malware identification system 100 (e.g., malware detection rate, false positive rate, etc.). In some embodiments, a suitable threshold value may depend on the technique used to generate quantitative identities for icon images and reference images, and/or on the technique used to determine whether an icon image is substantially similar to a reference image. In some embodiments, the threshold value may be set such that two images are determined to match when the difference between the images is less than approximately 40% (e.g., the threshold value may be set to 0.4), when the difference between the images is less than approximately 31% (e.g., the threshold value may be set to 0.31), when the difference between the images is less than approximately 22% (e.g., the threshold value may be set to 0.22), when the difference between the images is less than approximately 10% (e.g., the threshold value may be set to 0.10), or when the difference between the images is less than approximately 5% (e.g., the threshold value may be set to 0.05). In some embodiments, performing the method of FIG. 4 (described below) may tune the threshold value.

In some embodiments, the speed and/or efficiency of the image comparison step may be enhanced by determining the differences between various features of the images concurrently, and/or by terminating the comparison in response to determining that the images do not match, even if the comparison is incomplete.

If no match is found (step 314) between any reference image and any icon image associated with the software package, server 110 may terminate method 300 at step 316. If a match is found (step 314) between a reference image and at least one icon image associated with the software package, server 110 may assess the threat presented by the software (step 318). In some embodiments, assessing the threat presented by the software may comprise evaluating one or more threat criteria to determine whether the software poses a threat. In some embodiments, evaluating a threat criterion may comprise using visual and/or non-visual elements of the software package to assess the threat presented by the software.

In some embodiments, server 110 may determine whether the software package's authentication credentials (e.g., code-signing certificate) and icon images are associated with the same entity. For example, if the software package's icon images match images associated with a trusted software provider, server 110 may determine whether the software package can provide the authentication credentials of that same trusted software provider. If the software's authentication credentials and icon image(s) are not associated with the same entity, server 110 may determine that the software poses a potential threat (step 320) and notify client 105 of the potential threat (step 324). By contrast, if the software's authentication credentials and icon image(s) are associated with the same entity, server 110 may determine that the software does not pose a potential threat (step 320) and terminate method 300 at step 322.

In some embodiments, server 110 may determine whether the software package's non-visual attributes satisfy one or more criteria for legitimate use by a first software provider of a second software provider's trusted images. For example, thin client interfaces (e.g., VNC, Remote Desktop, Citrix) may legitimately use the trusted images associated with applications launched through the thin client interface. If the software's non-visual attributes indicate that the software is a thin-client interface, server 110 may determine that the software does not pose a potential threat (step 320) and terminate method 300 at step 322.

In some embodiments, server 110 may determine whether the information suggested by the software package's icon image is consistent with the software package's type. For example, a malware package may include an icon image (e.g., an image of a folder or a recycle bin) that suggests an operation performed by an operating system or software shell (e.g., a file management function). If the software package's icon image suggests an operation (e.g., an operating system operation) that is inconsistent with the software package's type (e.g., an executable file), server 110 may determine that the software package poses a potential threat (step 320) and notify client 105 of the potential threat (step 324).

As another example, a software package may include an icon image that matches a trusted image used by a software provider to indicate a particular file type (e.g., a "PDF" image used by Adobe to identify a Portable Document Format (.pdf) file). If the software package's file type does not match the file type suggested by the software package's icon image, server 110 may determine that the software package poses a potential threat (step 320) and notify client 105 of the potential threat (step 324).

As another example, a software package may include an icon image that matches a trusted image that identifies a known brand (e.g., the lower-case 'f' used by Facebook) or conveys a known message (e.g., a green shield indicating that a website is trustworthy). If legitimate uses of the trusted image as icons for software package packages are unknown, and the software package is executable, server 110 may determine that the software package poses a potential threat (step 320) and notify client 105 of the potential threat (step 324).

Embodiments have been described above in which server 110 notifies client 105 of a potential threat posed by a software package. In some embodiments, server 110 may notify a server administrator of the potential threat (e.g., in addition to notifying the client, prior to notifying the client, or as an alternative to notifying the client). In some embodiments, the administrator may evaluate the potential threat. If the administrator determines that the software package poses a real threat, the administrator may notify the client of the threat. If the administrator determines that the software package poses no threat, the administrator may retract any threat notification previously sent to the client. To evaluate the potential threat posed by a software package, the administrator may analyze the data identifying the software package (e.g., the software package's cryptographic hash), the icon image that matched a reference image in the group of reference images, the matching reference image, metadata describing the icon image, and/or the software package itself.

The performance of the malware detection system (e.g., speed, efficiency, rate of malware detection, rate of false positives, etc.) may depend, at least in part, on the number and contents of the reference images to which the icon images are compared. As the number of reference images increases and the distinctiveness of the reference images decreases, the amount of computation required to determine whether a software package poses a threat may increase and the rate of false positives may increase, though the increase in the rate of false positives may be ameliorated, at least in part, by decreasing the threshold value used to distinguish matching images from non-matching images. By contrast, limiting the group of reference images to a small number of distinctive, widely recognized reference images may reduce the amount of computation and the rate of false positives, at the risk of potentially lowering the rate of malware detection.

Figure 4:
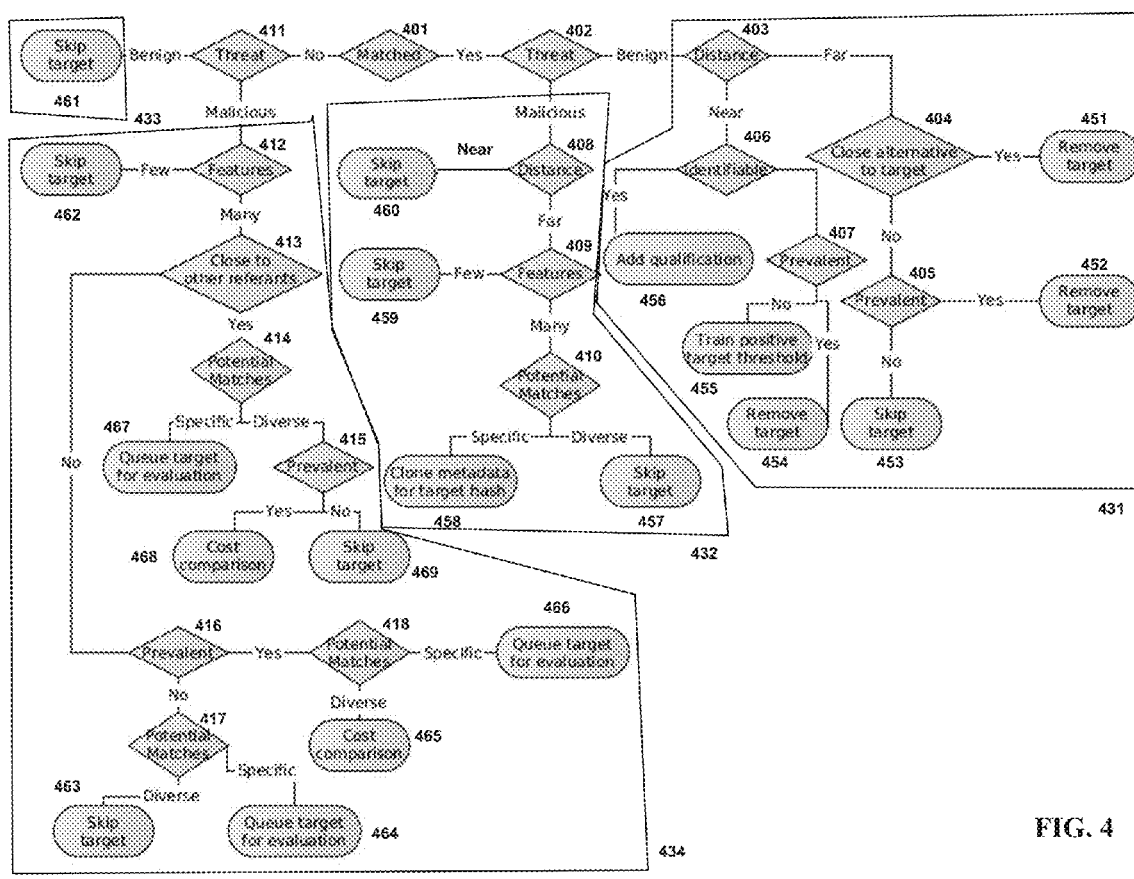
FIG. 4 is a flowchart of a method for selecting reference images, according to some embodiments.

In some embodiments, a method 400 as shown in FIG. 4 may be used to adjust the parameters of the malware detection system (e.g., to select the reference images, to adjust the threshold for determining whether an icon image matches a reference image, and/or to determine which threat criteria (if any) are used to evaluate the threat posed by a software package that matches a reference image). As described below, the decision to adjust the parameters of the malware detection system (e.g., to add a candidate image to the set of reference images) may depend, at least in part, on the number of reference images, the extent to which the candidate image is known or trusted, the extent to which known malware uses icon images similar to the candidate image, the distinctiveness of the candidate image, the similarity between the candidate image and existing reference images, the prevalence of the candidate image, and/or any other suitable information.

Some embodiments of method 400 are described below. Initially, the flowchart of FIG. 4 is described at a high level, with emphasis on how different portions of the flowchart relate to each other. Then each path through the flowchart of FIG. 4 is described, from the root node (401) to each of the terminal nodes (451-469), with emphasis on the scenarios in which the parameters of the malware detection system may be adjusted and the reasons why such adjustments are made. Then some techniques for implementing the steps of method 400 are described, according to some embodiments.

The following paragraphs describe a single iteration of method 400, as applied to a single image ("package image") extracted from a software package. One of ordinary skill in the art would understand that method 400 may be applied repeatedly to process multiple package images of one or more software packages. In some embodiments, method 400 may be performed repeatedly before and/or after the deployment of a system for detecting malware, to tune the system's parameters. Method 400 may be performed periodically, intermittently, continually, in response to specified events (e.g., failure to detect malware executed by a client computer, classification of a non-threating software package as malware, occurrence of a false positive rate of malware identification in excess of a specified rate, execution of a software package on a client computer, etc.), or at any other suitable time.

The flowchart of FIG. 4 includes four main branches 431-434, which correspond to the four potential outcomes when a malware detection system classifies a software package as a threat or a non-threat. In particular, a malware detection system may (1) mistakenly classify a benign software package as a threat ("false positive") (branch 431), (2) correctly classify a malware package as a threat ("true positive") (branch 432), (3) correctly classify a benign software package as a non-threat ("true negative") (branch 433), or (4) mistakenly classify a malware package as a non-threat ("false negative" or "miss") (branch 434). In some embodiments, performing method 400 may result in adjustments to the parameters of the malware detection system, which may decrease the rate of false positives, increase the rate of true positives, increase the rate of true negatives, and/or decrease the rate of false negatives.

At step 401, an image ("package image") corresponding to an icon included in a software package may be compared to a set of malware reference images, and a determination may be made as to whether the package image matches zero, one, or more of the reference images. In some embodiments, portions of method 300 (e.g., steps 304-314) may be performed to determine whether the package image matches any of the reference images. If the package image matches at least one reference image, step 402 of method 400 may be performed. Otherwise, step 411 of method 400 may be performed.

At step 402, a determination may be made as to whether the software package is a threat. This determination may be made using any suitable technique. In some embodiments, the software package may be classified as a threat or a non-threat by a human operator, or by any suitable malware detection system. If the software package is classified as a non-threat, branch 431 of method 400 is performed. Branch 431 handles false positive classifications, in which a non-threatening software package matches an image in the set of malware reference images. If the software package is classified as a threat, branch 432 of method 400 is performed. Branch 432 handles true positive classifications, in which a threatening software package matches an image in the set of malware reference images.

If the package image does match any reference images at step 401, step 411 may be performed. At step 411, a determination is made as to whether the software package is a threat. If the software package is classified as a non-threat, branch 434 of method 400 is performed. Branch 434 handles true negative classifications, in which a non-threatening software package does not match any image in the set of malware reference images. If the software package is classified as a threat, branch 433 of method 400 is performed. Branch 433 handles false negative classifications, in which a threatening software package does not match any image in the set of malware reference images.

As can be seen in FIG. 4, when a non-threatening software package matches an image ("target image") in the set of malware reference images (a false positive classification), a first parameter-tuning process 431 may be performed. Performing the first parameter-tuning process may include determining whether to retain the target image in the reference set, whether to remove the target image from the reference set, whether to adjust any malware-detection parameter (e.g., image-matching threshold or threat criterion) associated with the target image, and/or whether to perform any other suitable parameter-tuning act. In some embodiments, performing the first parameter-tuning process may decrease the malware detection system's rate of false positive classifications.

As shown in FIG. 4, the malware detection system may determine which parameter-tuning act(s) to perform during first parameter-tuning process 431 based, at least in part, on various data. Each of steps 451-456 in FIG. 4 corresponds to a parameter-tuning act performed in response to identifying a specific set of data associated with an image in the set of malware reference images. Parameter-tuning acts 451-456 and some examples of conditions that trigger these acts are described below.

Parameter-tuning act 451: In step 403, a determination is made that the difference between an icon image extracted from a software package ("package image") and a malware reference image ("target image") is large. In step 404, a determination is made that the set of malware reference images includes one or more close alternatives to the target image. In step 451, the target image is removed from the set of malware reference images. In this case, the target image may be causing false positives and the set of malware reference images already includes one or more other images suitable for matching the same images matched by the target image, so removing the target image may decrease the rate of false positives without increasing the rate of false negatives.

Parameter-tuning act 452: In step 403, a determination is made that the difference between the package image and the target image is large. In step 404, a determination is made that the set of malware reference images does not include any close alternatives to the target image. In step 405, a determination is made that the package image has high prevalence. In step 452, the target image is removed from the set of malware reference images. In this case, the target image may be causing a large number of false positives due to the high prevalence of the package image, so removing the target image may substantially decrease the rate of false positives.

Parameter-tuning act 453: In step 403, a determination is made that the difference between the package image and the target image is large. In step 404, a determination is made that the set of malware reference images does not include any close alternatives to the target image. In step 405, a determination is made that the package image has low prevalence. In step 453, the target image is retained in the set of malware reference images. In this case, the target image may be causing a small number of false positives due to the low prevalence of the package image, so removing the target image would probably not substantially decrease the rate of false positives. Furthermore, the reference set includes no other images similar to the target image, so removing the target image could potentially increase the rate of false negatives.

Parameter-tuning act 454: In step 403, a determination is made that the difference between the package image and the target image is small. In step 406, a determination is made that using one or more threat criteria in combination with the target image would not sufficiently distinguish benign software packages from malware. In step 407, a determination is made that the package image has high prevalence. In step 454, the target image is removed from the set of malware reference images. In this case, the target image may be causing a large number of false positives due to the high prevalence of the package image, so removing the target image may substantially decrease the rate of false positives. Furthermore, the target image is not widely recognizable, so removing the target image is unlikely to increase the rate of false negatives with respect to malware that spoofs widely recognizable images.

Parameter-tuning act 455: In step 403, a determination is made that the difference between the package image and the target image is small. In step 406, a determination is made that using one or more threat criteria in combination with the target image would not sufficiently distinguish benign software packages from malware. In step 407, a determination is made that the package image has low prevalence. In step 455, the target image is retained in the set of malware reference images, and the image-matching threshold associated with the target image is adjusted (e.g., lowered) so that greater similarity is required between a package image and the target image to trigger a match. In this case, the target image may be causing a small number of false positives due to the low prevalence of the package image, so removing the image would probably not substantially decrease the rate of false positives, but could increase the rate of false negatives. However, adjusting the image-matching threshold associated with the target image may reduce the rate of false positives without increasing the rate of false negatives.

Parameter-tuning act 456: In step 403, a determination is made that the difference between the package image and the target image is small. In step 406, a determination is made that using one or more threat criteria in combination with the target image would sufficiently distinguish benign software packages from malware. In step 456, the target image is retained in the set of malware reference images, and the one or more threat criteria are assigned to the target image (or the parameters associated with one or more threat criteria already assigned to the target image are adjusted). Thus, when a package image matches the target image, the malware detection system will classify the corresponding package as malware only if the assigned threat criteria are satisfied. In this case, the target image may be causing false positives, but is probably helpful for detecting malware spoofs of a widely recognizable image. Thus, tightening the threat criteria associated with the target image may reduce the rate of false positives without increasing the rate of false negatives.

The foregoing description of some embodiments of parameter-tuning process 431 is given by way of example and is not limiting. Any suitable technique may be used to tune the parameters of a malware detection system in response to detecting a false positive classification of a package image and/or software package.

As can be seen in FIG. 4, when an image ("package image") from a threatening software package matches an image in the set of malware reference images (a true positive scenario), a second parameter-tuning process 432 may be performed. Performing the second parameter-tuning process may include determining whether to add the package image to the set of malware reference images, and/or whether to perform any other suitable parameter-tuning act. In some embodiments, performing the second parameter-tuning process may increase the malware detection system's rate of true-positive classifications, and/or may facilitate a decrease in the malware detection system's rate of false-positive classifications, by facilitating tightening of the image-matching thresholds associated with the reference images.

As shown in FIG. 4, the malware detection system may determine which parameter-tuning act(s) to perform during second parameter-tuning process 432 based, at least in part, on various data. Each of steps 457-460 in FIG. 4 corresponds to a parameter-tuning act performed in response to identifying a specific set of data associated with a package image. Parameter-tuning acts 457-460 and some examples of conditions that trigger these acts are discussed below.

Parameter-tuning act 457: In step 408, a determination is made that the difference between the package image and each of the images in the set of malware reference images is large. In step 409, a determination is made that package image includes a large number of features. In step 410, a determination is made that the package image potentially matches a set of images with diverse features. In step 457, the package image is not added to the set of malware reference images. In this case, using the package image as a reference image could potentially be useful for detecting some malware, but the indiscriminate nature of the image's features could also potentially increase the rate of false positives.

Parameter-tuning act 458: In step 408, a determination is made that the difference between the package image and each of the images in the set of malware reference images is large. In step 409, a determination is made that package image includes a large number of features. In step 410, a determination is made the package image potentially matches a set of images with specific, homogeneous features. In step 458, the package image is added to the set of malware reference images. As described above, adding the image to the reference set may involve generating an identifier for the image (e.g., a cryptographic hash of the image). In this case, using the package as a reference image could potentially be useful for detecting some malware, and would probably not substantially increase the rate of false positive identifications.

Parameter-tuning act 459: In step 408, a determination is made that the difference between the package image and each of the images in the set of malware reference images is large. In step 409, a determination is made that the package image has few features. In step 459, the package image is not added to the set of malware reference images. In this case, using the package image as a reference image could potentially be useful for detecting some malware, but the indiscriminate nature of the image's features could also potentially increase the rate of false positive identifications.

Parameter-tuning act 460: In step 408, a determination is made that the difference between the package image and at least one of the images in the set of malware reference images is small. In step 460, the package image is not added to the set of malware reference images. In this case, the benefits of adding the package image to the reference set are likely to be negligible, because the reference set already includes at least one image similar to the package image.

The foregoing description of some embodiments of parameter-tuning process 432 is given by way of example and is not limiting. Any suitable technique may be used to tune the parameters of a malware detection system in response to detecting a true positive classification.

As can be seen in FIG. 4, when an image ("package image") from a non-threatening software package does not match any image in the set of malware reference images (a true negative identification), a third parameter-tuning process 433 may be performed. In some embodiments, performing the third parameter-tuning process may involve determining not to add the package image to the set of malware reference images (step 461). The foregoing description of some embodiments of parameter-tuning process 433 is given by way of example and is not limiting. Any suitable technique may be used to tune the parameters of a malware detection system in response to detecting a true negative classification.

As can be seen in FIG. 4, when an image ("package image") from a threatening software package does not match any image in the set of malware reference images (a false negative classification), a fourth parameter-tuning process 434 may be performed. Performing the fourth parameter-tuning process may include determining whether to add the target image to the set of malware reference images, and/or whether to perform any other suitable parameter-tuning act. In some embodiments, performing the fourth parameter-tuning process may decrease the malware detection system's rate of false-negative classifications.

As shown in FIG. 4, the malware detection system may determine which parameter-tuning act(s) to perform during fourth parameter-tuning process 434 based, at least in part, on various data. Each of steps 461-469 in FIG. 4 corresponds to a parameter-tuning act performed in response to identifying a specific set of data associated with a package image. Parameter-tuning acts 461-469 and some examples of conditions that trigger these acts are discussed below.

Parameter-tuning act 462: In step 412, a determination is made that the package image has few features. In step 462, the package image is not added to the set of malware reference images. In this case, using the package image as a reference image could potentially be useful for detecting some malware, but the indiscriminate nature of the image's features could also potentially increase the rate of false positive identifications.

Parameter-tuning act 463: In step 412, a determination is made that the package image has a large number of features. In step 413, a determination is made that none of the images in the set of malware reference images are close alternatives to the package image. In step 416, a determination is made that package image has low prevalence. In step 417, a determination is made that the package image potentially matches a set of images with diverse features. In step 463, the package image is not added to the set of malware reference images. In this case, using the package image as a reference image could potentially be useful for detecting some malware, but the indiscriminate nature of the image's features could also potentially increase the rate of false positive identifications.

Parameter-tuning act 464: In step 412, a determination is made that the package image has a large number of features. In step 413, a determination is made that none of the images in the set of malware reference images are close alternatives to the package image. In step 416, a determination is made that the package image has low prevalence. In step 417, a determination is made that the package image potentially matches a set of images with specific, homogeneous features. In step 464, the package image is added to the set of malware reference images, or flagged for evaluation by an administrator. In this case, using the package as a reference image could potentially be useful for detecting some malware, and would probably not substantially increase the rate of false positive identifications.

Parameter-tuning act 465: In step 412, a determination is made that the package image has a large number of features. In step 413, a determination is made that none of the images in the set of malware reference images are close alternatives to the package image. In step 416, a determination is made that the package image has high prevalence. In step 418, a determination is made that the package image potentially matches a set of images with diverse features. In step 465, a cost comparison is performed. Based on the outcome of the cost comparison, the package image may be added to the set of malware reference images, or the package image may be flagged for evaluation by an administrator, or a determination may be made to not add the package image to the reference set. In this case, using the package as a reference image could potentially be useful for detecting some malware, but could potentially cause a substantial increase in the rate of false positive identifications.

Parameter-tuning act 466: In step 412, a determination is made that the package image has a large number of features. In step 413, a determination is made that none of the images in the set of malware reference images are close alternatives to the package image. In step 416, a determination is made that the package image has high prevalence. In step 418, a determination is made that the package image potentially matches a set of images with specific, homogeneous features. In step 466, the package image is added to the set of malware reference images, or flagged for evaluation by an administrator. In this case, using the package as a reference image could potentially be useful for detecting some malware, and would probably not substantially increase the rate of false positive identifications.

Parameter-tuning act 467: In step 412, a determination is made that the package image has a large number of features. In step 413, a determination is made that at least one of the images in the set of malware reference images is a close alternative to the package image. In step 414, a determination is made that the package image potentially matches a set of images with specific, homogeneous features. In step 467, the package image is added to the set of malware reference images, or flagged for evaluation by an administrator. In this case, using the package as a reference image could potentially be useful for detecting some malware, and would probably not substantially increase the rate of false positive identifications.

Parameter-tuning act 468: In step 412, a determination is made that the package image has a large number of features. In step 413, a determination is made that at least one of the images in the set of malware reference images is a close alternative to the package image. In step 414, a determination is made that the package image potentially matches a set of images with diverse features. In step 415, a determination is made that the package image has high prevalence. In step 468, a cost comparison is performed. Based on the outcome of the cost comparison, the package image may be added to the set of malware reference images, or the package image may be flagged for evaluation by an administrator, or a determination may be made to not add the package image to the reference set. In this case, using the package as a reference image could potentially be useful for detecting some malware, but the indiscriminate nature of the image's feature could potentially cause a substantial increase the rate of false positive identifications.

Parameter-tuning act 469: In step 412, a determination is made that the package image has a large number of features. In step 413, a determination is made that at least one of the images in the set of malware reference images is a close alternative to the package image. In step 414, a determination is made that the package image potentially matches a set of images with diverse features. In step 415, a determination is made that the package image has low prevalence. In step 469, the package image is not added to the set of malware reference images. In this case, using the package image as a reference image could potentially be useful for detecting some malware, but the indiscriminate nature of the image's feature could potentially cause a substantial increase in the rate of false positive identifications.

The foregoing description of some embodiments of parameter-tuning process 434 is given by way of example and is not limiting. Any suitable technique may be used to tune the parameters of a malware detection system in response to detecting a false negative classification.

The foregoing description of some embodiments of a method 400 for tuning the parameters of a malware detection system refers to a number of steps in which respective determinations are made. Some embodiments of techniques for making such determinations are described below.

In method 400 (e.g., in step 403 and/or step 408), the difference between a package image and a reference image may be determined. In some embodiments, the difference between the images may be determined using the technique of step 312 of method 300. In some embodiments, the difference between the two images may be classified as substantial ("large") if the difference between the images exceeds a threshold difference. Otherwise, the difference between the two images may be classified as insubstantial ("small").

In method 400 (e.g., in step 404 and/or step 413), a determination may be made as to whether the set of malware reference images includes one or more close alternatives to a candidate image. In some embodiments, making this determination may involve comparing the candidate image to the reference images, determining the respective differences between the candidate image and the reference images, and/or determining whether the respective differences between the candidate image and the reference images are less than a threshold less than a threshold difference. In some embodiments, making this determination may involve determining whether any reference images match the same malware image(s) matched by the candidate image.

In method 400 (e.g., in step 405, 407, 415, and/or 416), a determination may be made as to whether the prevalence of an image is low or high. In some embodiments, the prevalence of an image may depend on the number of distinct software packages that contain the image, the number of distinct locations from which software packages containing the image may be obtained, and/or the number of times client computers access software packages containing the image. In some embodiments, the prevalence of an image may be classified as high if the prevalence exceeds a threshold prevalence. Otherwise, the prevalence of the image may be classified as low.

In method 400 (e.g., in step 406), a determination may be made as to whether one or more threat criteria may be used to distinguish between benign software packages that include icons matching an image and malware packages that include icons matching the same image. In some embodiments, the extent to which one or more threat criteria distinguish malware matching an image from benign software matching the image may be determined by applying the one or more threat criteria (e.g., individually or in combinations of two or more) to software packages matching the image, determining the false positive and/or false negative rates of malware identification achieved with the one or more criteria, and comparing the false positive and/or false negative rates to threshold rates. In some embodiments, one or more threat criteria may be selected for use with an image if the one or more threat criteria yield better false positive and/or false negative rates than corresponding threshold rates.

In method 400 (e.g., in step 409 and/or step 412), a determination may be made as to whether an image has many features or few features. In some embodiments, the number of features in an image may be determined by using any suitable feature-recognition technique. In some embodiments, the number of image features may be classified as "many" if the number of features exceeds a threshold number. Otherwise, the number of image features may be classified as "few".

In method 400 (e.g., in step 410, 414, 417, and/or 418), a determination may be made as to whether an image potentially matches other images with diverse features or other images with specific, homogeneous features. The diversity or specificity of the features of matching images may be assessed using any suitable technique.

In method 400 (e.g., in step 465 and/or 468), a cost comparison may be performed. Based on the outcome of the cost comparison, a candidate image may be added to the set of malware reference images, or the candidate image may be flagged for evaluation by an administrator, or a determination may be made to not add the candidate image to the reference set. In some embodiments, the cost of including the candidate image, in terms of false positive risk and impact, may be calculated in consideration of one or more aspects concerning one or more software packages that are potential matches (e.g., "diverse" potential matches, in contrast to "specific" potential matches) for the candidate image, including, without limitation, prevalence of installations of the software package(s), whether the software package(s) are critical to business operations, whether the software package(s) can be excluded by additional threat criteria, and/or whether the software package(s) or use(s) thereof are related to the malware detection system or its usage.

In some embodiments, the false positive cost analysis may be performed on two or more (e.g., all) of the potentially matching software packages, and the results of the individual false positive cost analyses may be aggregated to determine a net false-positive cost of adding the candidate image to the reference set. In some embodiments, the false positive cost analysis may be performed on a single potentially matching software package, and the result of the single false positive cost analysis may be used as a representative false-positive cost of adding the candidate image to the reference set. The single software package may be selected from the group of potentially matching software packages using any suitable technique. In some embodiments, the single software package may selected based on its prevalence and/or criticality to business operations.

In some embodiments, the cost of forgoing the candidate image, in terms of false negative risk and impact, may be calculated in consideration of one or more aspects concerning one or more software packages that are potential matches (e.g., "specific" potential matches, in contrast to "diverse" potential matches) for the candidate image, including, without limitation, the prevalence of the software package(s), the severity of threat to business operations posed by the software package(s), whether the software package(s) already can or could in future be detected by techniques independent of the candidate image, and whether the icon-based deception is essential to the propagation and execution of the software package(s).

In some embodiments, the false negative cost analysis may be performed on two or more (e.g., all) of the potentially matching software packages, and the results of the individual false negative cost analyses may be aggregated to determine a net false-negative cost of not adding the candidate image to the reference set. In some embodiments, the false negative cost analysis may be performed on a single potentially matching software package, and the result of the single false negative cost analysis may be used as a representative false-negative cost of not adding the candidate image to the reference set. The single software package may be selected from the group of potentially matching software packages using any suitable technique. In some embodiments, the single software package may selected based on its prevalence and/or criticality to business operations.

In some embodiments, the false-positive cost (e.g., the aggregated or representative false-positive cost) may be compared to the false negative cost (e.g., the aggregated or representative false-negative cost) to determine whether to add the candidate image to the reference set.

An example has been described in which method 400 is applied in response to a malware detection system's classification of a single software package having a single package image. In some embodiments, method 400 may be applied to one or more software packages, each of which may include one or more package images. The package images may be compared to a set of malware reference images, and each package image may match zero, one or more reference images.

In some embodiments, a candidate reference image may be evaluated by provisionally adding the candidate image to the set of reference malware images, and performing method 400. If the candidate image is not suitable for inclusion in the reference set, the candidate image may be removed from the reference set during the performance of method 400.

In some embodiments, the parameter-tuning method may be highly selective, such that images are added to and/or remain in the set of malware reference images only if restrictive criteria are satisfied. Method 400 is an example of a highly selective parameter-tuning method.

In some embodiments, the parameter-turning method may be trust-inclusive, such that icon images associated with highly trusted software packages are indiscriminately added to the set of malware reference images.

In some embodiments, the parameter-tuning method may be reputation-based, such that icon images are assigned respective reputation scores and indiscriminately added to the set of malware reference images. In the latter scenario, the classification of a software package as malware or legitimate software may depend, at least in part, on the reputation score(s) of the software package's icon images.

Figure 5:
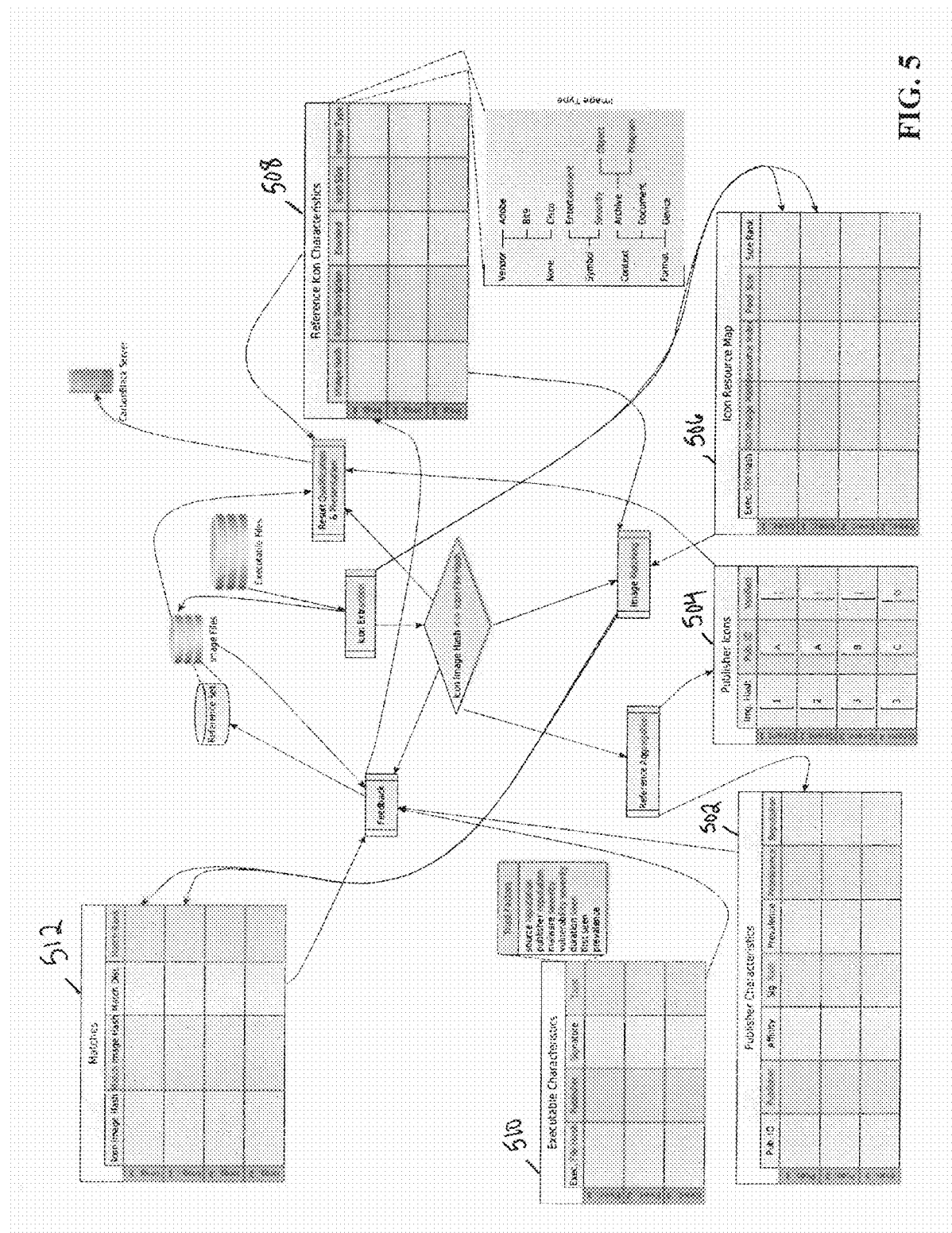
FIG. 5 shows a software architecture of a system for identifying malware, according to some embodiments.

A method 300 for identifying malware may be implemented using any suitable technique. In some embodiments, a method 300 for identifying malware may be implemented as software executing on one or more computers. FIG. 5 shows a software architecture of a system for identifying malware, according to some embodiments. As described above, the system may include an index 510 of data identifying software packages. As can be seen in FIG. 5, the software package index 510 may include a software package identifier (e.g., a cryptographic hash of an executable file), the software package's publisher, the software package's signature (e.g., authentication credentials), the software package's trust level, and/or any other suitable data. In some embodiments, the software package's trust level may depend, at least in part, on the reputation of the software package's provider (e.g., the website from which the software was downloaded), the reputation of the software package's publisher, the severity of any malware known to be included in the software package, the severity of any security vulnerabilities known to be associated with the software package, the date when the software package was first identified, the duration of the time period for which the software package has been available, the prevalence of the software package, and/or any other suitable information.

In some embodiments, a system for identifying malware may store an index 502 of software publishers. As can be seen in FIG. 5, the publisher index 502 may include, for each software publisher, an identifier, name, affinity, signature rate, prevalence, prominence, reputation, and/or any other suitable data. The signature rate refers to the portion of the software distributed by the publisher that is signed by the publisher. The signature rate may be determined using any suitable technique, including, without limitation, obtaining software distributed by the publisher and determining whether the software carries a signature (e.g., an authenticode). In some embodiments, the malware detection system may identify a software package as malware if (1) the software package contains icons substantially similar to reference images associated with the publisher, (2) the software package is not signed with the publisher's valid certificate, and (3) the publisher has a relatively high signature rate (e.g., the publisher's signature rate exceeds a specified threshold).

In some embodiments, a system for identifying malware may store an index 504 of icons. As can be seen in FIG. 5, the icon index 504 may include, for each icon, an identifier (e.g., a cryptographic hash of the icon image), the identifier of the icon's publisher, data indicating whether the icon's legitimacy has been verified, and/or any other suitable data.

In some embodiments, a system for identifying malware may store an index of icon resources. As can be seen in FIG. 5, the icon resource index 506 may include, for each icon, an identifier of the software package from which the icon was extracted, an identifier of the icon, a resource index, a pixel size value, a size rank value, and/or any other suitable data.

In some embodiments, a system for identifying malware may store an index 508 of reference icon characteristics. As can be seen in FIG. 5, the reference icon characteristic index 508 may include, for each icon, an identifier, a description, data indicating whether the icon is enabled, the icon size, the icon image type, and/or any other suitable data.

In some embodiments, a system for identifying malware may store an index 512 of matches between reference images and icon images extracted from software packages. As can be seen in FIG. 5, the match index 512 may include, for any matching icon-image/reference-image pair, an icon identifier, a reference image identifier, data characterizing the difference (e.g., distance) between the icon image and the reference image, a ranking of the match, and/or any other suitable data.

Representative Implementation

Figure 6:
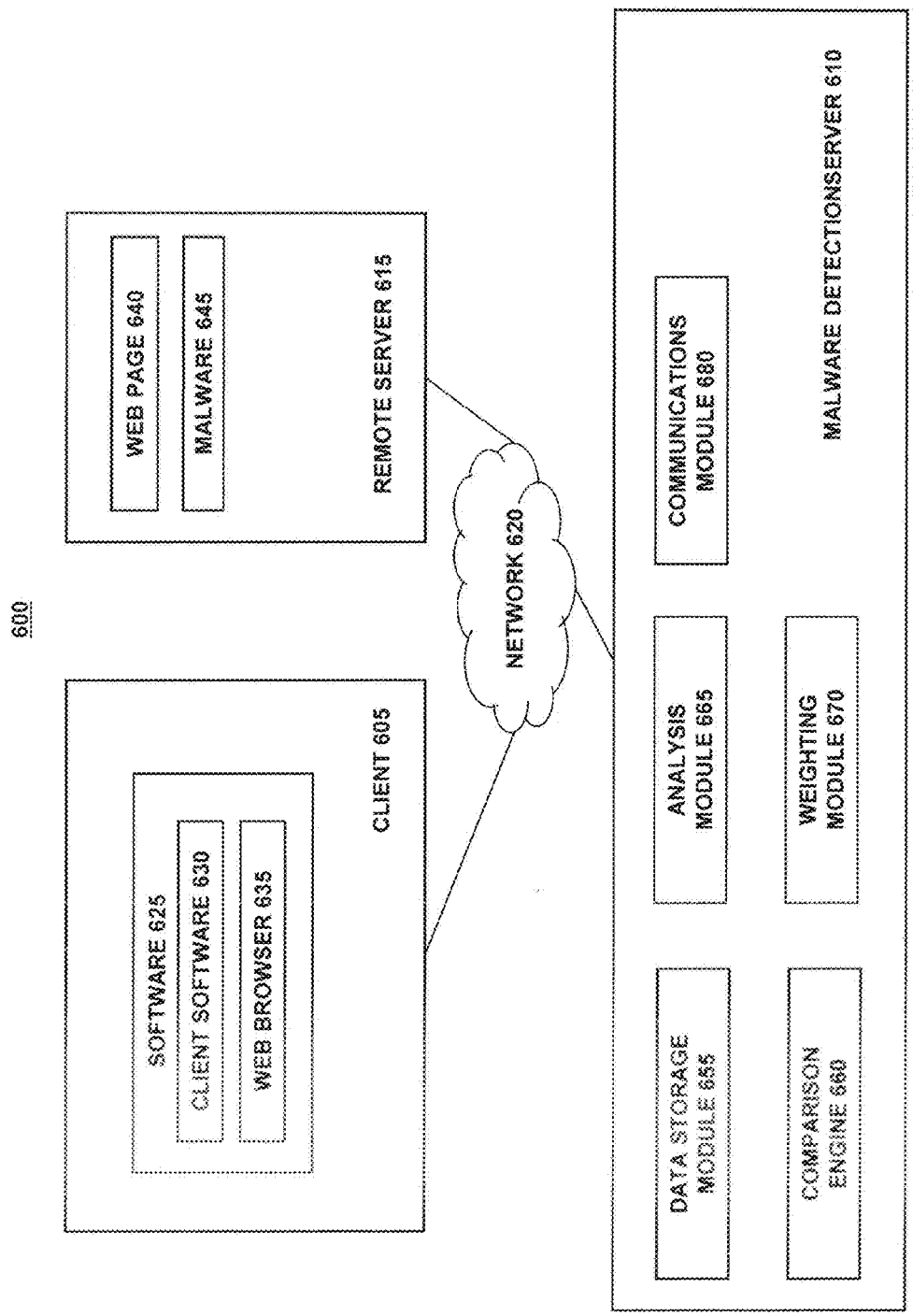
FIG. 6 is a schematic of a system for identifying malware, according to some embodiments.

Referring to FIG. 6, in one embodiment, the system 600 includes at least one client computer 605, a malware detection server 610 and a remote server 615. The illustrative configuration is only for exemplary purposes, and it is intended that there can be any number of clients 605 and servers 610, 615. In some embodiments, malware detection server 610 may perform one or more (e.g., all) of the steps of malware detection method 300.

A communications network 620 connects the client 605 with the malware detection server 610 and the remote server 615. The communication may take place via any media such as standard telephone lines, LAN or WAN links (e.g., T1, T3, 56 kb, X.25), broadband connections (ISDN, Frame Relay, ATM), and/or wireless links (IEEE 802.11, Bluetooth). Preferably, the network 620 can carry TCP/IP protocol communications, and HTTP/HTTPS requests made by client 605 and the servers 610, 615 can be communicated over such TCP/IP networks. The type of network is not a limitation, however, and any suitable network may be used. Non-limiting examples of networks that can serve as or be part of the communications network 620 include a wireless or wired ethernet-based intranet, a local or wide-area network (LAN or WAN), and/or the global communications network known as the Internet, which may accommodate many different communications media and protocols.

The client 605 is preferably implemented with software 625 running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and/or various varieties of Unix, such as SUN SOLARIS from SUN MICROSYSTEMS, and GNU/Linux from RED HAT, INC. of Durham, N.C. The client 605 may also be implemented on such hardware as a smart or dumb terminal, network computer, wireless device, wireless telephone, information appliance, workstation, minicomputer, mainframe computer, personal data assistant, or other computing device that is operated as a general purpose computer, or a special purpose hardware device used solely for serving as a client 605.

Generally, in some embodiments, clients 605 can be operated and used for various activities including sending and receiving electronic mail and/or instant messages, requesting and viewing content available over the World Wide Web, participating in chat rooms, or performing other tasks commonly done using a computer, handheld device, or cellular telephone. Clients 605 can also be operated by users on behalf of others, such as employers, who provide the clients 605 to the users as part of their employment.

In various embodiments, the client computer 605 includes client software 630, a web browser 635, or both. The web browser 635 allows the client 605 to request a web page or other downloadable program, applet, or document (e.g., from the remote server 615) with a web-page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 605 manually requests a web page 640 from the remote server 615. Alternatively, the client 605 automatically makes requests by means of the web browser 635. In either case, one or more malware files and/or applications 645 may be transmitted from the remote server 615 to the client 605 over the network 620, unbeknownst to the user. Examples of commercially available web browser software 635 are INTERNET EXPLORER, offered by Microsoft Corporation, NETSCAPE NAVIGATOR, offered by AOL/Time Warner, or FIREFOX offered the Mozilla Foundation.

In some embodiments, the client 605 also includes client software 630. The client software 630 provides, for example, functionality to the client 605 that allows a user to send and receive electronic mail, instant messages, telephone calls, video messages, streaming audio or video, or other content. In such cases, malware files or applications 645 may be transmitted to the client 605 from one or more remote servers 615, or the user may be misled and purposely, albeit unknowingly, permit malware to be transmitted to the client 605. For example, a user may be reading an electronic mail message from an on-line retailer, and be presented with an advertisement that offers free merchandise or a chance to win a valuable prize. In selecting the advertisement by, for example, clicking on a link to a URL or initiating an email, the user may inadvertently allow the remote server 615 to transmit malware to the client 605. Examples of client software 630 include, but are not limited to OUTLOOK and OUTLOOK EXPRESS, offered by Microsoft Corporation, THUNDERBIRD, offered by the Mozilla Foundation, and INSTANT MESSENGER, offered by AOL/Time Warner. Not shown are standard components associated with client computers, including a central processing unit, volatile and non-volatile storage, input/output devices, and a display.

The malware detection server 610 interacts with the client 605. The server 610 is preferably implemented on one or more server-class computers that have sufficient memory, data storage, and processing power and that run a server-class operating system (e.g., SUN Solaris, GNU/Linux, and the MICROSOFT WINDOWS family of operating systems). System hardware and software other than that specifically described herein may also be used, depending on the capacity of the device and the size of the user base. For example, the server 610 may be or may be part of a logical group of one or more servers such as a server farm or server network. As another example, there may be multiple servers 610 associated with or connected to each other, or multiple servers may operate independently, but with shared data. In a further embodiment and as is typical in large-scale systems, application software can be implemented in components, with different components running on different server computers, on the same server, or some combination.

The malware detection system 600, in one embodiment, includes a data storage module 655, a comparison engine 660, an analysis module 665 and a weighting module 670. In the implementation described herein, the data storage module 655, analysis module 665, comparison engine 660, and weighting module 670 reside on malware detection server 610. In some embodiments, the malware detection server 610 may also include a communications module 680 to communicate the results of the comparison step to the client 605. In other embodiments, comparison engine 660 may reside on the client 605, and communications module 680 may communicate malware detection rules and other statistical information to the client 605 over the network 620 where the communication network 620 is the Internet, an intranet, or the like.

The modules described throughout the specification can be implemented in whole or in part as a software program using any suitable programming language or languages (C++, C#, java, LISP, BASIC, PERL, etc.) and/or as a hardware device (e.g., ASIC, FPGA, processor, memory, storage and the like).

Data storage module 655 may store the data described above with reference to FIGS. 3-5, including, without limitation, software package index 510, software publisher index 502, icon index 504, icon resource index 506, reference icon characteristic index 508, and/or match index 512. The data storage module 655 may store information and data representing known malware signatures, one or more "white lists" that identify known trusted files, statistical information regarding various metadata (e.g., metadata types, values, stability values and selectivity values) and malware detection rules used to identify malware. The data storage module 655 provides such data to the comparison engine 660, which compares icon images to reference images. The data storage module 655 may be implemented using, for example, the MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif. Based on the results of comparisons performed by the comparison engine 660 and/or data stored in the data storage module 655, the analysis module 665 applies one or more malware detection rules to determine whether the candidate software is malware. In some embodiments, the weighting module 670 adjusts the rules based on the computed stability and selectivity values of the metadata elements that comprise the rules, e.g., by assigning weights to individual rules, or in some cases individual metadata types within the rules, to further hone system accuracy (both with respect to identifying malware and reducing false positives). This process of evaluating and weighting rules and metadata types is preferably ongoing as the system operates facilitating continuous (or periodic) fine tuning. In some embodiments, the ongoing evaluation may occur across many client computers connected to each other and/or one or more central servers.

EQUIVALENTS

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for identifying potential enterprise cyber threats camouflaged as legitimate software packages, the method comprising:
    performing, by a processing device:
        identifying visual and non-visual elements of a software package being presented for an action on an endpoint device within an enterprise, the visual element comprising an icon image;
        determining that the icon image is substantially similar to a reference image by performing a comparison of the icon image and the reference image;
        extracting the non-visual elements from the software package, wherein the extracted non-visual elements include authentication credentials of the software package;
        determining whether the authentication credentials of the software package match authentication credentials of an entity associated with the reference image determined to be substantially similar to the icon image;
        determining what proportion of software associated with the entity is signed by the entity; and
        determining whether the software package comprises a legitimate software package or a potential threat to the enterprise based, at least in part, on the determination of whether the authentication credentials of the software package match the authentication credentials of the entity associated with the reference image, and on the proportion of software signed by the entity.

2. The method of claim 1 wherein the non-visual elements comprise one or more of a publisher, filenames, external function calls, registered operating system functions, operating system filenames, registry key, system file value, application filenames, library filenames, file size, provider, vendor tags and path names.

3. The method of claim 1 wherein the size of the visual elements is less than 1 megabyte.

4. The method of claim 1 wherein performing the comparison further comprises application of one or more filters.

5. The method of claim 4 wherein the one or more filters comprise one or more of a domain-specific filter or a class filter.

6. The method of claim 1 further comprising performing, by the processing device: compiling a database of potential threats based on the determination of whether the software package comprises a legitimate software package or a potential threat to the enterprise.

7. The method of claim 1 further comprising performing, by the processing device: compiling a database of trust rules based on the determination of whether the software package comprises a legitimate software package or a potential threat to the enterprise.

8. The method of claim 7 wherein the trust rules are annotated to include trusted provider upon determination of new trusted providers.

9. The method of claim 1 further comprising performing, by the processing device: providing trusted update paths for software packages as an alternative for software packages deemed untrustworthy.

10. The method of claim 1 wherein the action is selected from the group consisting of: an update of a software component, an update of a software application, an update of a software library, an update of an application extension, installation of a software component, installation of a software application, installation of an application extension, installation of a software library, and execution of a software component.

11. The method of claim 1 wherein the visual elements and non-visual elements are each extracted from separate components of the software package.

12. The method of claim 1, wherein performing the comparison of the icon image and the reference image comprises determining a difference between a quantitative identity of the icon image and a quantitative identity of the reference image.

13. The method of claim 12, further comprising performing, by the processing device: determining the quantitative identity of the icon image.

14. The method of claim 13, wherein determining the quantitative identity of the icon image comprises transforming the icon image.

15. The method of claim 14, wherein transforming the icon image comprises performing an act selected from the group consisting of: applying a noise filter to the icon image, scaling the icon image, reflecting the icon image, and performing color reduction on the icon image.

16. The method of claim 14, wherein determining the quantitative identity of the icon image further comprises applying an edge-detection operator to the transformed icon image.

17. The method of claim 16, wherein the edge-detection operator comprises a Marr-Hildreth operator.

18. The method of claim 12, wherein performing the comparison of the icon image and the reference image further comprises determining whether the difference between the quantitative identity of the icon image and the quantitative identity of the reference image is less than a threshold difference.

19. The method of claim 18, further comprising performing, by the processing device: increasing the threshold difference based, at least in part, on a determination that the icon image is not substantially similar to the reference image and a determination that the software package comprises a potential threat to the enterprise.

20. The method of claim 18, further comprising performing, by the processing device: decreasing the threshold difference based, at least in part, on a determination that the icon image is substantially similar to the reference image and a determination that the software package comprises a legitimate software package.

21. The method of claim 1, wherein the extracted non-visual elements further include a type of the software package; wherein the method further comprises determining whether the icon image is consistent with the type of the software package; and wherein determining whether the software package comprises a legitimate software package or a potential threat to the enterprise is further based on whether the icon image is consistent with the type of the software package.

22. The method of claim 21, wherein determining whether the icon image is consistent with the type of the software package comprises:
  determining that the icon image is associated with a non-executable file type;
  determining that the software package is executable; and
  determining that the icon image is not consistent with the type of the software package.

23. The method of claim 21, wherein determining whether the icon image is consistent with the type of the software package comprises:
  determining that the icon image is associated with a function of an operating system;
  determining that the software package is executable; and
  determining that the icon image is not consistent with the type of the software package.

24. The method of claim 1, further comprising performing, by the processing device: removing the reference image from a plurality of reference images based, at least in part, on a determination that the icon image is substantially similar to the reference image and a determination that the software package comprises a legitimate software package.

25. The method of claim 1, further comprising performing, by the processing device: adding the icon image to a plurality of reference images based, at least in part, on a determination that the icon image is not substantially similar to any of the reference images and a determination that the software package comprises a potential threat to the enterprise.

* * * * *